United States Patent
Drogichen et al.

(10) Patent No.: US 6,425,094 B1
(45) Date of Patent: Jul. 23, 2002

(54) DIAGNOSTIC CAGE FOR TESTING REDUNDANT SYSTEM CONTROLLERS

(75) Inventors: Daniel P. Drogichen, Leucadia, CA (US); Eric Eugene Graf, Hillsboro, OR (US); Douglas B. Meyer, San Diego, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/371,059

(22) Filed: Aug. 9, 1999

(51) Int. Cl.[7] .................. H02H 3/05; H03K 19/003; H04B 1/74; G06F 15/00
(52) U.S. Cl. .................. 714/41; 714/11; 714/15; 714/30; 714/3; 712/30
(58) Field of Search .................. 714/10, 11, 12, 714/13, 15, 25, 30, 31, 3; 712/30; 713/100; 710/302, 108, 200

(56) References Cited

U.S. PATENT DOCUMENTS

| | | | | |
|---|---|---|---|---|
| 4,133,027 A | * | 1/1979 | Hogan | 364/119 |
| 4,342,084 A | | 7/1982 | Sager et al. | 364/200 |
| 4,503,535 A | * | 3/1985 | Budde et al. | 371/11 |
| 4,684,885 A | | 8/1987 | Chapman et al. | 324/73 R |
| 4,914,572 A | | 4/1990 | Bitzinger et al. | 364/200 |
| 5,416,921 A | | 5/1995 | Frey et al. | 395/575 |
| 5,623,643 A | | 4/1997 | Janssen et al. | 395/500 |
| 5,765,034 A | | 6/1998 | Recio | 395/287 |

OTHER PUBLICATIONS

"Ultra™ Enterprise™ 10000: Dynamic System Domains," Technical White Paper, © 1997 by Sun Microsysytems, Inc., pp. 1–11.

"Ultra™ Enterprise™ 10000 Server: SunTrust™ Reliability, Availability, and Serviceability," Technical White Paper, © 1997 by Sun Microsystems, Inc., pp. 1–29.

Charlesworth, "Starfire: Extending the SMP Envelope," IEEE Micro, Jan. 1998, pp. 39–49.

Partial chapter describing the I²C bus interface unit of the 1960® RM/RN I/O Processor, printed from the intel® website on May 20, 1999, 5 pages.

"High Performance Memory," Sun Enterprise Servers, © 1994–1998 by Sun Microsystems, Inc., 2 pages.

"Expandable I/O Modules," Sun Enterprise Servers, © 1994–1998 by Sun Microsystems, Inc., 3 pages.

Gigaplane–XB™ Interconnect, Sun Enterprise Servers, © 1994–1998 by Sun Microsystems, Inc., 3 pages.

"System Architecture," Sun Enterprise Servers, © 1994–1998 by Sun Microsystems, Inc., 3 pages.

(List continued on next page.)

*Primary Examiner*—Robert Beausoleil
*Assistant Examiner*—Marc Duncan
(74) *Attorney, Agent, or Firm*—Conley, Rose & Tayon, PC; B. Noël Kivlin

(57) ABSTRACT

A multiprocessor system is disclosed that employs an apparatus and method for caging a redundant component to allow testing of the redundant component without interfering with normal system operation. In one embodiment the multiprocessor system includes at least two system controllers and a set of processing nodes interconnected by a network. The system controllers allocate and configure system resources, and the processing nodes each include a node interface that couple the nodes to the system controllers. The node interfaces can be individually and separately configured in a caged mode and an uncaged mode. In the uncaged mode, the node interface communicates information from either of the system controllers to other components in the processing node. In the caged mode, the node interface censors information from at least one of the system controllers.

13 Claims, 2 Drawing Sheets

OTHER PUBLICATIONS

System Architecture, System Service Processor (SSP), Sun Enterprise Servers, © 1994–1998 by Sun Microsystems, Inc., 2 pages.

"SunTrust Availability," Sun Enterprise Servers, © 1994–1998 by Sun Microsystems, Inc., 4 pages.

"Solaris™," Sun Enterprise Servers, © 1994–1998 by Sun Microsystems, Inc., 4 pages.

"Dynamic System Domains," Sun Enterprise Servers, © 1994–1998 by Sun Microsystems, Inc., 3 pages.

* cited by examiner

DIAGNOSTIC CAGE FOR TESTING REDUNDANT SYSTEM CONTROLLERS

BACKGROUND OF THE INVENTION

1. Field of the Invention

This invention relates to the field of multiprocessor computer systems with built-in redundancy, and more particularly, to systems and methods for testing redundant functional components during normal system operation.

2. Description of the Related Art

Multiprocessor computer systems include two or more processors which may be employed to perform computing tasks. A particular computing task may be performed upon one processor while other processors perform unrelated computing tasks. Alternatively, components of a particular computing task may be distributed among multiple processors to decrease the time required to perform the computing task as a whole. Generally speaking, a processor is a device that executes programmed instructions to produce desired output signals, often in response to user-provided input data.

A popular architecture in commercial multiprocessor computer systems is the symmetric multiprocessor (SMP) architecture. Typically, an SMP computer system comprises multiple processors each connected through a cache hierarchy to a shared bus. Additionally connected to the shared bus is a memory, which is shared among the processors in the system. Access to any particular memory location within the memory occurs in a similar amount of time as access to any other particular memory location. Since each location in the memory may be accessed in a uniform manner, this structure is often referred to as a uniform memory architecture (UMA).

Another architecture for multiprocessor computer systems is a distributed shared memory architecture. A distributed shared memory architecture includes multiple nodes that each include one or more processors and some local memory. The multiple nodes are coupled together by a network. The memory included within the multiple nodes, when considered as a collective whole, forms the shared memory for the computer system.

Distributed shared memory systems are more scaleable than systems with a shared bus architecture. Since many of the processor accesses are completed within a node, nodes typically impose much lower bandwidth requirements upon the network than the same number of processors would impose on a shared bus. The nodes may operate at high clock frequency and bandwidth, accessing the network only as needed. Additional nodes may be added to the network without affecting the local bandwidth of the nodes. Instead, only the network bandwidth is affected.

Because of their high performance, multiprocessor computer systems are used for many different types of mission-critical applications in the commercial marketplace. For these systems, downtime can have a dramatic and adverse impact on revenue. Thus system designs must meet the uptime demands of such mission critical applications by providing computing platforms that are reliable, available for use when needed, and easy to diagnose and service.

One way to meet the uptime demands of these kinds of systems is to design in fault tolerance, redundancy, and reliability from the inception of the machine design. Reliability features incorporated in most multiprocessor computer systems include environmental monitoring, error correction code (ECC) data protection, and modular subsystem design. More advanced fault tolerant multiprocessor systems also have several additional features, such as full hardware redundancy, fault tolerant power and cooling subsystems, automatic recovery after power outage, and advanced system monitoring tools.

For mission critical applications such as transaction processing, decision support systems, communications services, data warehousing, and file serving, no hardware failure in the system should halt processing and bring the whole system down. Ideally, any failure should be transparent to users of the computer system and quickly isolated by the system. The system administrator must be informed of the failure so remedial action can be taken to bring the computer system back up to 100% operational status. Preferably, the remedial action can be made without bringing the system down.

In many modern multiprocessor systems, fault tolerance is provided by identifying and shutting down faulty processors and assigning their tasks to other functional processors. However, faults are not limited to processors and may occur in other portions of the system such as, e.g., interconnection traces and connector pins. While these are easily tested when the system powers up, testing for faults while the system is running presents a much greater challenge. This may be a particularly crucial issue in systems that are "hot-swappable", i.e. systems that allow boards to be removed and replaced during normal operation so as to permit the system to be always available to users, even while the system is being repaired.

Further, some multiprocessor systems include a system controller, which is a dedicated processor or subsystem for configuring and allocating resources (processors and memory) among various tasks. Fault tolerance for these systems may be provided in the form of a "back-up" system controller. It is desirable for the primary and redundant system controllers to each have the ability to disable the other if the other is determined to be faulty. Further, it is desirable to be able to test either of the two subsystems during normal system operation without disrupting the normal system operation. This would be particularly useful for systems that allow the system controllers to be hot-swapped.

SUMMARY OF THE INVENTION

Accordingly, there is disclosed herein a multiprocessor system that employs an apparatus and method for caging a redundant component to allow testing of the redundant component without interfering with normal system operation. In one embodiment the multiprocessor system includes at least two system controllers and a set of processing nodes interconnected by a network. The system controllers allocate and configure system resources, and the processing nodes each include a node interface that couple the nodes to the system controllers. The node interfaces can be individually and separately configured in a caged mode and an uncaged mode. In the uncaged mode, the node interface communicates information from either of the system controllers to other components in the processing node. In the caged mode, the node interface censors information from at least one of the system controllers. When all node interfaces censor information from a common system controller, this system controller is effectively "caged" and communications from this system controller are thereby prevented from reaching other node components. This allows the caged system controller along with all its associated interconnections to be tested without interfering with normal operation of the system. Normal system configuration tasks are handled by the uncaged system controller. The uncaged system controller can instruct the node interfaces to uncage the caged system controller if the tests are successfully completed.

BRIEF DESCRIPTION OF THE DRAWINGS

A better understanding of the present invention can be obtained when the following detailed description of the preferred embodiment is considered in conjunction with the following drawings, in which.

Figure 1:
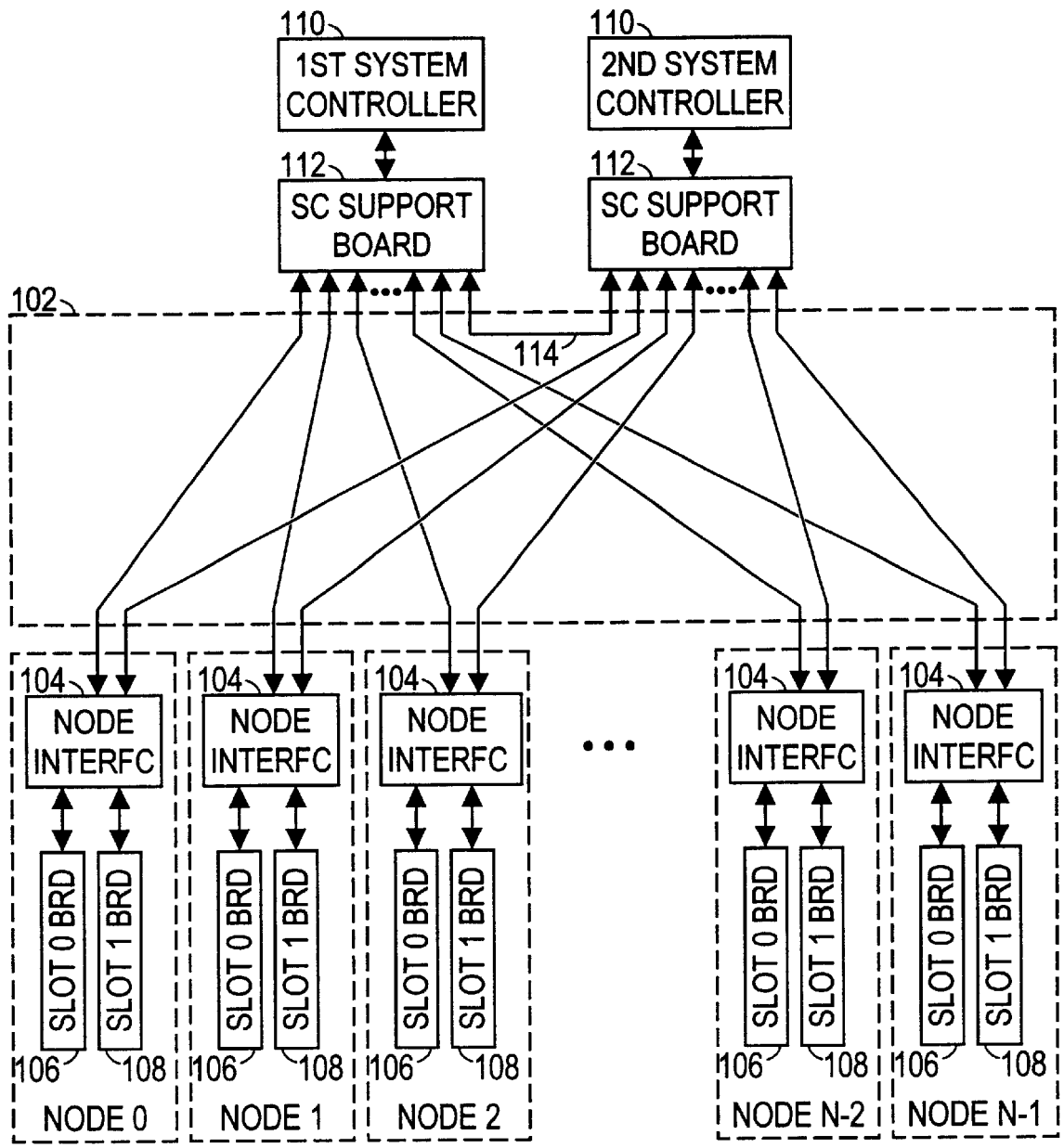
FIG. 1 is a functional block diagram of a multiprocessor system.

While the invention is susceptible to various modifications and alternative forms, specific embodiments thereof are shown by way of example in the drawings and will herein be described in detail. It should be understood, however, that the drawings and detailed description thereto are to not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to the figures, FIG. 1 shows a block diagram of a multiprocessor system. The system includes a center plane 102 that interconnects N nodes (designated Node 0 through Node N-1) with a network bus (not shown). The network bus is preferably a crossbar network. The nodes preferably each include a node interface board 104 which accepts up to two boards one of which is designated as a "Slot 0 board" 106 while the other is designated as a "Slot 1 board" 108. Slot 0 boards are preferably multiprocessor boards that each include four processors, a memory module, and a system interface interconnected by a bus, and various support chips. Slot 1 boards are preferably I/O boards that interface to various peripherals such as serial and parallel ports, disk drives, modems, printers, etc. In addition to the described types of Slot 0 and Slot 1 boards, other board types may be used, and the mix of the various board types among the various nodes is preferably alterable.

The system also includes at least two system controllers 110 which are preferably coupled to the center plane 102 by corresponding system controller support boards 112. The center plane 102 preferably provides busses from the support boards 112 to the nodes for maintenance, monitoring, and configuration of the nodes. The center plane 102 may also provide an arbitration bus 114 that allows the system controllers 110 to arbitrate for communication privileges to the nodes.

For a mission-critical system, it is necessary that the various components be hot-swappable so that defective components can be removed and replaced without bringing the system down. Accordingly, each of the node interface boards 104 and support boards 112, along with their dependent boards, can be removed and replaced while the system is operating. Since insertion is an event that has a relatively high failure probability, it is desirable to test the newly inserted components along with their physical interface to the system prior to trusting them with substantive tasks. The ensuing description focuses on testing of the system controllers 110 and support boards 112, but it is recognized that the nodes may be similarly tested.

Figure 2:
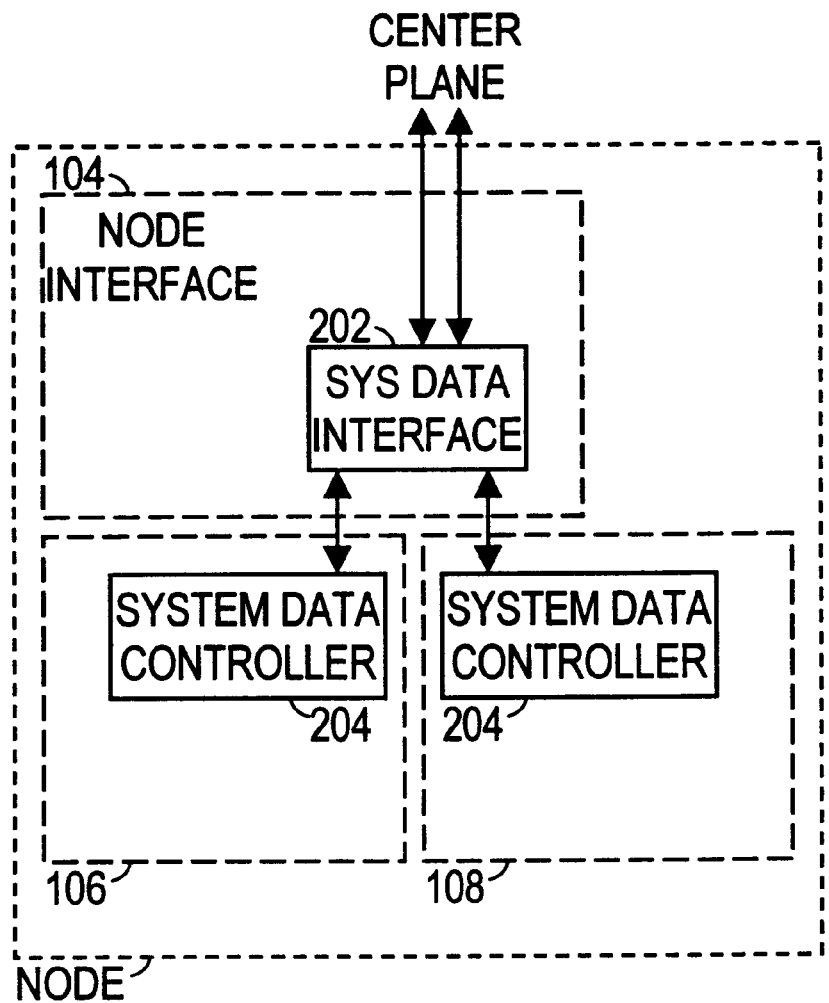
FIG. 2 is a functional block diagram of a processor node.

FIG. 2 shows selected components common to each of the nodes. The node interface board 104 includes a system data interface chip 202, and each board 106, 108 includes a system data controller chip 204 that operates to configure and monitor various components on the board in accordance with information received from the system controller via the system data interface chip 202. The system data interface chip also operates to configure and monitor various components in the node interface 104 in accordance with communications received from the system controller. Both chips 202 and 204 are preferably able to parse address information and route communications from the system controller to the components indicated by the address information. The chips 202, 204 may additionally convert the communications into whatever form or bus protocol may be needed for the destination component to understand the message.

Referring concurrently to both FIGS. 1 and 2, the system data interface chip 202 has a dedicated port for each of the system controllers 110, so that all communications with a given system controller are conducted via the associated port. The system data interface (SDI) chip 202 also includes some error detection and notification circuitry. If the SDI chip 202 detects that a communication from a given system controller is corrupted, the SDI chip 202 can communicate an error notification to that system controller. However, if the SDI chip 202 is unable to It determine the source of the error (e.g. when receiving conflicting communications from different system controllers) the SDI chip 202 may assert a system interrupt signal to alert the system controllers to the error event.

SDI chip 202 includes some status, configuration and test registers. The status registers may be read by the system controllers to determine error conditions, for example. One of the configuration registers includes "cage" mode bits that can be asserted and de-asserted only by an "uncaged" system controller. An uncaged system controller may put one or all of its interfaces into a cage mode, but an uncaged system controller will be required to put them back into an uncaged mode. It is noted that in situations where both node interfaces are caged, or a caged system controller can not respond to a command to exit the cage, either system controller (whether caged or not) can initiate a bus reset that will force the node interface back to an uncaged mode.

Either of the system controllers can be caged by assertion of an associated cage mode bit. The assertion of cage mode bits may be accomplished by one of the system controllers writing an individual caging message to each of the nodes. The SDI chips 202 in each of the nodes interpret the caging message and assert the cage mode bit for the designated system controller. The system controller designated in the caging message to a node interface is hereafter referred to as a caged system controller for that node interface. Conversely, a system controller for which the cage mode bits in a node interface are not asserted is hereafter referred to as an uncaged system controller for that node interface.

Either of the system controllers can have one or more of its interfaces caged by writing a cage enable message to the pertinent node interfaces. If all node interfaces have the same system controller interface caged, then the system controller is said to be completely caged. If not all not all node interfaces have the same system controller interface caged, then the system controller is incompletely caged, and it is permitted to communicate with interfaces for which it is uncaged.

Assertion of a cage mode bit causes the SDI chip 202 to censor any communications received from the caged system controller. The SDI chip 202 may communicate responses to the caged system controller such as, e.g. error notification for corrupted communications. The SDI chip 202 may also operate on communications from the caged system controller, e.g. storing values in the test registers. However, the SDI chip 202 does not transmit any messages to other downstream components in response to communications received from the caged system controller. This includes configuration messages for the boards 106, 108, as well as messages for other components on node interface board 104. The SDI chip also suppresses interrupts triggered by communications from the caged system controller, such as a protocol error interrupt that would normally be caused by a message from the caged system controller that conflicts with a message received from the other system controller.

When the multiprocessor computer system is first powered up, the primary system controller runs through a Power-On-Self-Test (POST) which tests all of the components on the system controller and then tests all of the interconnections to other boards/components in the multiprocessor system. Since no user applications are active, serious or fatal errors will not cause service interruptions. However, if the multiprocessor system is executing user applications and a secondary system controller needs to be tested, then the caging mode may be employed to test the secondary system controller while the primary system controller continues providing services to the hardware and mastering all maintenance buses required for testing. The caging mode will prevent the system controller under test from inadvertently destroying state information in the active hardware or causing an error which would not be isolated and would be reported as an system error from the component under test. Such actions would probably bring down the multiprocessor system.

Referring to FIG. 1, a newly inserted system controller support board 112 with attached system controller 110 is caged by placing all of its node interfaces into caging mode. This can be done by the newly inserted system controller or by the resident system controller. A test process executing on the caged system controller is then able to verify the functionality of not only the on-board components, but also the components on the support board 112, the center plane 102, and portions of the SDI chip 202. It is noted that the interconnections between the system controller 110, the support board 112, the center plane 102, and the node interface 104 are also verified by the test process. The uncaged system controller can check for successful completion of the test process, e.g. by reading status registers in the caged system controller and/or status registers in the SDI chips 202, and broadcast an uncaging message to the SDI chips 202 if the test process is determined to have completed successfully.

In addition to testing itself, the caged system controller is able to test off-board interconnects without concern of interfering with running software applications and the primary system controller. Without this ability, the caged system controller could not detect faulty interconnections with the rest of the system. If untested interconnections to the inserted system controller were faulty, this would not be known until after the primary system controller had failed. At that point the faults would appear and the system would probably crash. The detection of interconnect faults before failure of the primary system controller allows time for notification and for remedial action.

It is noted that discussion has centered on testing of a redundant system controller by placing all node interfaces into the caging mode. However, the described embodiment also allows node interfaces to be separately and individually placed into the caging mode. This allows testing of individual bus connections while the system controller is able to maintain its duties elsewhere.

One embodiment of the invention has been generally described above. The following discussion describes various details of one particular preferred implementation for explanatory purposes. However, the invention is not so limited.

The invention may be employed in a next generation, UltraSPARC III based, high-end enterprise server system. The system controllers may be single processor based subsystems which provide many global resources to all of the multiprocessor hardware. The system controllers may employ a variety of buses to obtain complete access to all hardware. Preferably, more than one system controller is present at any given time one but only one is active. The second system controller preferably waits in a stand-by mode in case the primary system controller experiences a hardware failure.

The system controller interconnections to other hardware occur through various buses such as 12C (Inter-Integrated Circuit), JTAG (Joint Test Activity Group), and Console Bus. In a normal (uncaged) operating mode, the node interfaces multiplex together both system controller's Console Buses and provide no hardware isolation. Thus, all boards and components in the system see all transactions emanating from either system controller. In caging mode, the node interfaces isolate a system controller and its Console Bus interconnections to the various hardware boards to prevent faults and protocol errors from propagating. This allows the system to properly test a system controller board while the system is running user application programs without causing a complete system crash.

The center plane may be a 16×16 crossbar interconnection network such as Sun Microsystems' Inc. Gigaplane-XB. This center plane contains two symmetrical sides which can each mount up to eight system boards, a support board and a system controller board. The system boards reside on node interface boards that connect to the center plane through 12C bus and Console Bus. The 12C bus is a serial data bus developed by Philips Corporation consisting of a two line interface. One line consists of a data pin for input and output functions and the other line is a clock for reference and control.

Console Bus is a bus developed by Sun Microsystems Inc. and is used by the system controller as a pathway for status and control of all system functions. The System Data Interface (SDI) chip contains a console bus interface used by the system controller as a pathway for status monitoring and configuration control of all system functions. The console bus is the primary system control/diagnostics bus and is required to operate correctly at all times while the system is operational. Dual console bus interfaces, one to each system controller, are provided for redundancy.

Because of its critical importance, the SDI also contains a console bus cage mechanism to facilitate diagnostic testing of one of the two console bus interfaces while the other console bus interface is actively being used by the system for monitoring and configuration functions. Additionally, both interfaces of an SDI chip may be caged and tested independently if the situation requires (e.g. when a new node is inserted into a working system). The console bus cage operates to ensure that any event (correct or erroneous) that occurs while accessing a caged console bus has no impact on the normal functioning of the rest of the system, and specifically not on the other console bus operations. If a system controller after being caged and tested is not functioning correctly, the uncaged system controller can access SDI status registers that contain diagnostic identification information to determine the nature of the errors.

During normal operation, the uncaged Console Bus interface in the SDI chip handles any address translations required from the node interface board to either of the resident Slot 0 and Slot 1 boards. In this mode, a single state machine may be shared between the SDI console bus ports. In the caged mode, a second state machine may be used to handle transactions with the caged system controller. The transition from uncaged mode to caged mode can occur at any time. However, to avoid protocol errors, the transition from the caged mode to uncaged mode can occur only when the uncaged mode state machine is quiescent. A cage control register includes bits for indicating the activity of the state machines and the cage mode bits for caging the system controllers.

All accesses from a caged system controller are examined to determine if they are within the allowed range of addresses for status and test registers. Accesses outside this range are responded to with an illegal-access-error acknowledgement, and the access is suppressed. Error notifications may be posted in an error (status) register, but no interrupts are caused by caged transactions.

An example of a Slot 0 board which may be employed in the system is multiprocessor system board that holds four Sun Microsystems UltraSPARC III microprocessors with supporting level two cache. An example of a Slot 1 board which may be employed in the system is an I/O board with multiple PCI interfaces with slots for networking and I/O adapters. PCI bus is a standard bus used in computer systems to communicate data, instructions and control information between logic circuits.

The system controller support boards connect the system controllers to the center plane through the Console Bus and the I2C bus. The system controller support boards are repeaters, that is, they amplify and multiply the output signals from the system controller board and send them to the center plane for output to the node interface boards. The system controller board contains some system-level logic that includes a system clock generator, temperature and airflow monitoring circuitry, and a PCI interface to a computer system which handles diagnostics, boot, shutdown and environmental monitoring. The multiprocessor computer system requires only one system control board for proper operation. However, for higher levels of system availability, a second optional system control board may be installed.

The computer system included in the system controller board includes an UltraSparc IIi microprocessor and various programmable read only memories (PROM) containing software for configuration and testing of the hardware in the multiprocessor computer system. The system level logic converts PCI signals into I2C and Console Bus and, after amplification and multiplication in the support board, sends these signals to the center plane. The system-level logic also controls JTAG scan chains which connect through the center plane and all hardware boards in the multiprocessor computer system. JTAG test access ports are present throughout the center plane and various boards of the multiprocessor computer system and allow for greater visibility and verification of system boards when the system controller performs the POST.

During operation of the multiprocessor computer system, a replacement microprocessor board or I/O board after it has been inserted must be attached electrically to the remainder of the hardware. The component must be isolated from the other hardware present in the computer system and tested prior to and during attachment. Finally, the hardware component must be incorporated logically into the running multiprocessor computer system to run the operating system and execute application programs for users.

In one preferred embodiment, the replacement microprocessor or I/O board becomes a part of a dynamic system domain after it has been inserted into the center plane of the multiprocessor computer system. Dynamic system domains are software partitions that permit the multiprocessor computer system to be dynamically subdivided into multiple computers. A dynamic system domain may consist of one or more system boards. Each domain is a separate shared-memory SMP system that runs its own local copy of a multiprocessor operating system such as Sun Microsystems Solaris and has its own disk storage and network connections. Because individual system domains are logically isolated from other system domains, hardware and software errors are confined to the domain in which they occur and do not affect the rest of the system. After a system administrator requests a particular domain configuration, the system controller configures the various microprocessor and I/O boards into dynamic system domains in the multiprocessor computer system.

Modifications to the hardware makeup of a domain may be required while the multiprocessor computer system is in operation. In order to facilitate run time changes in dynamic system domain configuration, system administrators should be able to dynamically switch system boards between domains or remove them from active domains for testing, upgrades, or servicing. Ideally after testing or service hardware boards should be easily reintroduced into one of the active domains without interrupting system operation. Each system domain is administered through the system controller which services all the domains. The system controllers may interface to a SPARC workstation or equivalent computer system board that runs a standard operating system such as Microsoft Windows NT or Microsoft Windows 98, Sun Microsystems Solaris, IBM AIX, Hewlett Packard UX or some similar equivalent and a suite of diagnostic and management programs. The external computer system may be connected via a network interface card such as Ethernet to the system controller located in the multiprocessor computer system. The microprocessor in the system controller board interprets the network interface card (e.g. TCP/IP Ethernet) traffic and converts it to encoded control information.

Numerous variations and modifications will become apparent to those skilled in the art once the above disclosure is fully appreciated. It is intended that the following claims be interpreted to embrace all such variations and modifications.

What is claimed is:

1. A computer system comprising:
   a plurality of processing nodes including one or more processors interconnected by a network bus and configured to execute programmed instructions; and
   a primary system controller and a secondary system controller each coupled to independently configure said plurality of processing nodes into one or more dynamic system domains, wherein a given system domain formed by selected ones of said processing nodes is logically isolated from another system domain formed by other processing nodes;
   wherein each of said processing nodes further includes a node interface unit including a plurality of bus interfaces for communicating with said primary and said secondary system controller, wherein said node interface unit is configured to operate in a caged mode by selectively isolating a given system controller and selected ones of said plurality of bus interfaces;

wherein said given system controller that is isolated during operation in said caged mode is configured to perform a self-test and testing of a communication path between said given system controller and said selected ones of said plurality of bus interfaces during operation of said one or more dynamic system domains.

2. The computer system as recited in claim 1, wherein said secondary system controller is further configured to operate in a stand-by mode while said primary system controller is configuring said plurality of processing nodes into one or more dynamic system domains.

3. The computer system as recited in claim 2, wherein said node interface unit is further configured to isolate said given system controller in response to receiving a corresponding communication from said given system controller that is not isolated by said node interface unit.

4. The computer system as recited in claim 3, wherein said node interface unit is further configured to isolate said given system controller in response to receiving a corresponding communication from said secondary system controller that is not isolated by said node interface unit.

5. The computer system as recited in claim 4, wherein said node interface unit is further configured to remove said given system controller from isolation in response to receiving a corresponding communication from another system controller that is not isolated by said node interface unit.

6. The computer system as recited in claim 5, wherein said node interface unit includes status, configuration and test registers and is further configured to modify selected ones of said status, configuration and test registers in response to communications from said given system controller that is isolated.

7. The computer system as recited in claim 6, wherein said node interface unit is further configured to provide error notifications during testing to said given system controller that is isolated.

8. The computer system as recited in claim 7, wherein each of said primary and said secondary system controllers are further configured to initiate a bus reset forcing said node interface unit from said caged mode to an uncaged mode.

9. The computer system as recited in claim 8 further comprising a bus interconnect unit coupled to convey information between said plurality of bus interfaces within said node interface unit and said primary system controller and said secondary system controller.

10. The computer system as recited in claim 9, wherein errors detected as a result of said self test and said testing of a communication path between said given system controller and said selected ones of said plurality of bus interfaces are prevented from affecting operations of said one or more dynamic system domains.

11. The computer system as recited in claim 10, wherein a said given system controller that is not isolated is configured to determine whether said given system controller that is isolated has successfully completed testing by performing read operations of said status registers within said node interface unit.

12. The computer system as recited in claim 11, wherein a said given system controller that is not isolated is further configured to cause said node interface unit to operate in said uncaged mode in response to determining that said self test of said given system controller that is isolated and said testing of a communication path between said given system controller and said selected ones of said plurality of bus interfaces has resulted in a successful completion.

13. The computer system as recited in claim 12, wherein said node interface unit is further configured to isolate said given system controller and said selected ones of said plurality of bus interfaces independently of each other for testing.

\* \* \* \* \*